US011379857B2

(12) United States Patent
Shea et al.

(10) Patent No.: US 11,379,857 B2
(45) Date of Patent: Jul. 5, 2022

(54) DETERMINING QUALIFIED EXCHANGES

(71) Applicant: INTERNATIONAL BUSINESS MACHINES CORPORATION, Armonk, NY (US)

(72) Inventors: Cynthia Christian Shea, Austin, TX (US); Christopher Seigle, Washington, DC (US); Christopher Sidler, Bethesda, MD (US)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 16/990,024

(22) Filed: Aug. 11, 2020

(65) Prior Publication Data
US 2022/0051262 A1 Feb. 17, 2022

(51) Int. Cl.
*G06Q 30/00* (2012.01)
*G06Q 50/26* (2012.01)
*G06Q 40/04* (2012.01)
*G06F 16/23* (2019.01)

(52) U.S. Cl.
CPC ..... *G06Q 30/0185* (2013.01); *G06F 16/2379* (2019.01); *G06Q 40/04* (2013.01); *G06Q 50/26* (2013.01)

(58) Field of Classification Search
CPC .... G06Q 30/0185; G06Q 40/04; G06Q 50/26; G06F 16/2379
USPC ........................................................ 705/3–44
See application file for complete search history.

(56) References Cited

U.S. PATENT DOCUMENTS

| 6,453,305 | B1* | 9/2002 | Glassman | G06F 21/10 |
| | | | | 705/51 |
| 8,204,809 | B1* | 6/2012 | Wise | G06Q 40/06 |
| | | | | 705/35 |
| 2006/0080217 | A1* | 4/2006 | Blackall | G06Q 40/04 |
| | | | | 705/37 |
| 2008/0301059 | A1* | 12/2008 | Ramsey | G06Q 40/00 |
| | | | | 705/36 R |

(Continued)

FOREIGN PATENT DOCUMENTS

| WO | WO-2009142829 A1 * | 11/2009 | ............. G06Q 40/04 |
| WO | WO-2010104618 A1 * | 9/2010 | ............. G06Q 10/04 |

OTHER PUBLICATIONS

Mohammad Hashemi Joo et al., Business and Economics—Banking Finance, Business Finance and Economics Management, Emerald Group Publishing Limited, ISSN 03074358, May 28, 2020.*

(Continued)

*Primary Examiner* — Frantzy Poinvil
(74) *Attorney, Agent, or Firm* — Brandon L. Stephens

(57) ABSTRACT

A method, a computer program product, and a computer system determine a qualified exchange. The method includes receiving a request for a status of an exchange. The method includes determining the status of the exchange using a qualification analysis. The qualification analysis includes a plurality of prevailing factors and a multi-step analysis. Satisfaction of one of the prevailing factors automatically qualifies the status of the exchange as the qualified exchange. the multi-step analysis includes a plurality of tests. Satisfaction of each of the tests qualifies the status of the exchange as the qualified exchange. The method includes generating and transmitting a response indicative of the status of the exchange.

20 Claims, 6 Drawing Sheets

(56) References Cited

U.S. PATENT DOCUMENTS

| | | | | |
|---|---|---|---|---|
| 2011/0055112 | A1* | 3/2011 | Haines | G06Q 40/06 |
| | | | | 705/36 R |
| 2012/0246052 | A1* | 9/2012 | Taylor | G06Q 40/06 |
| | | | | 705/37 |
| 2014/0164288 | A1* | 6/2014 | Present | G06Q 40/06 |
| | | | | 705/36 R |
| 2015/0324909 | A1* | 11/2015 | deOliveira | G06Q 40/04 |
| | | | | 705/38 |
| 2016/0027102 | A1* | 1/2016 | Smith | G06Q 40/00 |
| | | | | 705/35 |
| 2019/0095996 | A1 | 3/2019 | Song | |
| 2019/0164094 | A1 | 5/2019 | Ferranti | |
| 2019/0164134 | A1* | 5/2019 | Morrow | G06Q 30/0282 |
| 2019/0164172 | A1 | 5/2019 | Ferranti | |
| 2019/0332985 | A1 | 10/2019 | Epstein | |
| 2020/0302745 | A1* | 9/2020 | Merati | G07F 17/3244 |

OTHER PUBLICATIONS

Grace Period Disclosure Redline Version, "Methodology for Identifying Qualified Regulated Markets", Aug. 16, 2019, pp. 1-13.
Grace Period Disclosure, Email from inventor, Cynthia Shea, dated Aug. 16, 2019, "RE: Regulated market methodology document", pp. 1-3.
Grace Period Disclosure, Draft, "Methodology for Identifying Qualified Regulated Markets", Aug. 16, 2019, pp. 1-13.
Mell et al., "The NIST Definition of Cloud Computing", National Institute of Standards and Technology, Special Publication 800-145, Sep. 2011, pp. 1-7.

* cited by examiner

DETERMINING QUALIFIED EXCHANGES

STATEMENT REGARDING PRIOR DISCLOSURES BY INVENTOR OR A JOINT INVENTOR

The following disclosure(s) are submitted under 35 U.S.C. § 102(b)(1)(A):
DISCLOSURES: A similar iteration of the present invention was presented to a client via email with a clean version of the iteration and a redline version from an earlier iteration. The email, "RE: Regulated Market methodology document," describes a summarized approach to the invention and was transmitted on Aug. 16, 2019. The redline version, "Methodology for identifying qualified regulated markets," was attached in the email transmitted on Aug. 16, 2019 and the clean version, "Methodology for identifying qualified regulated markets," was also attached in the email transmitted on Aug. 16, 2019. A copy of the email and the attachments are provided on a concurrently filed Information Disclosure Statement (IDS).

BACKGROUND

The exemplary embodiments relate generally to regulated markets, and more particularly to a plurality of analyses to determine whether a stock exchange is a qualified exchange including prevailing factors and a multi-step analysis.

Financial institutions are required by local anti-money laundering (AML) laws to perform Know Your Customer (KYC) procedures when opening a new account or when updating company information. Some AML laws allow the KYC process to be simplified when a company is a legal entity whose shares are listed on a stock exchange that meets certain criteria. The present invention establishes a standard and analysis approach which produces a Qualified Exchange Library, meaning that the standards of establishing ownership are being met as well as there being transparency and reporting that minimize the likelihood that an entity listed on that exchange may be involved in or associated with financial crime or other forms of financial risk. When considering only the Qualified Exchange Library as the basis in which to determine whether an exchange is a Qualified Exchange, certain exchanges that are otherwise qualified may still be considered as not Qualified under the methodology. In contrast, when establishing a score to determine whether an exchange is a Qualified Exchange according to a threshold score, certain exchanges that may not be a Qualified Exchange may still be considered as qualified.

SUMMARY

The exemplary embodiments disclose a method, a computer program product, and a computer system for determining a qualified exchange. The method comprises receiving a request for a status of an exchange. The method comprises determining the status of the exchange using a qualification analysis. The qualification analysis includes a plurality of prevailing factors and a multi-step analysis. Satisfaction of one of the prevailing factors automatically qualifies the status of the exchange as the qualified exchange. the multi-step analysis includes a plurality of tests. Satisfaction of each of the tests qualifies the status of the exchange as the qualified exchange. The method comprises generating and transmitting a response indicative of the status of the exchange.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

Figure 1:
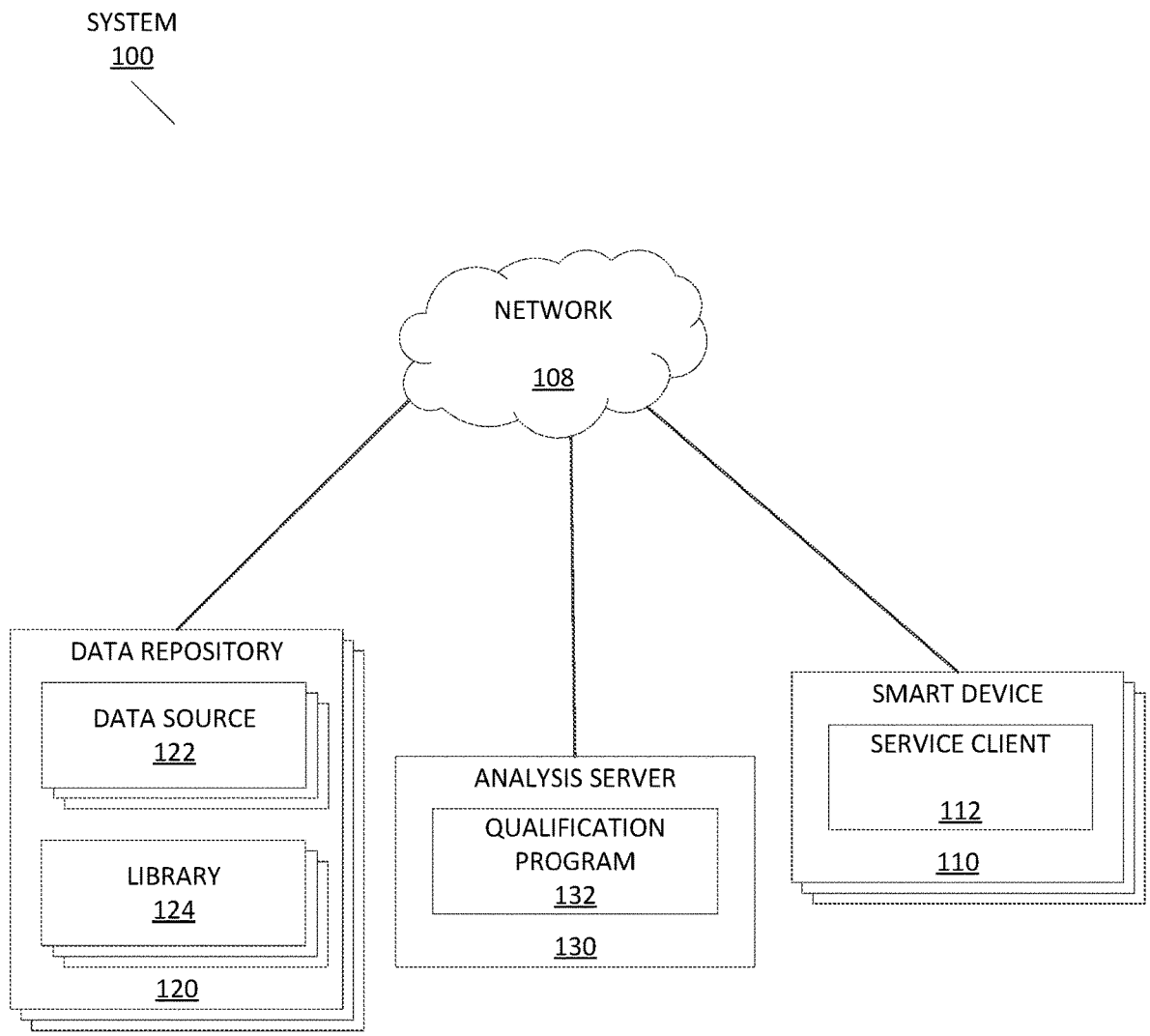
FIG. 1 depicts an exemplary schematic diagram of a qualification system 100, in accordance with the exemplary embodiments.

The drawings are not necessarily to scale. The drawings are merely schematic representations, not intended to portray specific parameters of the exemplary embodiments. The drawings are intended to depict only typical exemplary embodiments.

In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are described with various terminology. In describing the exemplary embodiments, the term "Qualified Exchange" refers to an exchange that has been determined to be qualified based on the analysis performed by the exemplary embodiments. The term "qualified exchange" refers generally to an exchange that is qualified. The term "exchange" refers to any exchange on which companies may be listed. The term "financial institution" refers to an entity that performs due diligence on a company that is listed on an exchange.

The exemplary embodiments are directed to a method, computer program product, and system for determining a Qualified Exchange through a plurality of analyses where the Qualified Exchange may be a qualified regulated market. As will be described in greater detail herein, the exemplary embodiments provide a qualification analysis including a plurality of prevailing factors that may be used to determine whether an exchange is a Qualified Exchange when any of the prevailing factors is satisfied or utilize a multi-step analysis that may be used to determine whether an exchange is a Qualified Exchange when all of the steps are satisfied. The exemplary embodiments may utilize the prevailing factors as an initial determination for an exchange and subsequently utilize the multi-step analysis when the initial determination disqualifies the exchange as a Qualified Exchange. In this manner, the exemplary embodiments may assess an exchange such that any exchange that is a Qualified Exchange is determined while any exchange that is not a Qualified Exchange is also determined without resulting in false positives or false negatives. Key benefits of the exemplary embodiments may include providing assurance that companies or customers including those listed on the Qualified Exchange Library are subject to robust and consistently enforced transparency, disclosure, and reporting rules dynamically as such aspects may evolve over time. Detailed implementation of the exemplary embodiments follows.

Conventionally, there is no specific global guidance establishing the qualifications or attributes of an exchange that allows companies listed on that exchange to forego disclosure of their ultimate beneficial owners to financial institutions. Different regions, countries, unions, etc. (collectively referred to herein as "regions") may utilize different standards to determine the qualification of an exchange. Within each region, different standards may be established for exchanges within the region versus those outside the region. Most regions across the globe have anti-financial crime laws that require regulated financial institutions to identify and verify the identity of individuals that hold a certain percentage of ownership of a company. However, certain regions exempt companies listed on qualified exchanges from this requirement. For example, the European Union (EU) has a EU Fourth Anti-Money Laundering (AML) Directive that allows covered financial institutions to exempt companies from the requirement to identify beneficial owners if the company, as stated in Section 1, Article 3, 6(a)(1), is "listed on a regulated market that is subject to disclosure requirements consistent with Union law or subject to equivalent international standards which ensure adequate transparency of ownership information." In addition, the Fourth EU AML Directive also allows covered financial institutions to exercise simplified due diligence on lower risk companies, as stated in Section 2, Articles 15 and 16, which may include public companies listed on a stock exchange and subject to disclosure requirements (e.g., either by stock exchange rules or through laws or other enforceable means), which impose requirements to ensure adequate transparency of beneficial ownership. Accordingly, because there are less due diligence requirements, there is a significant benefit in terms of compliance resourcing to having a simple and reliable tool to identify companies meeting such criteria.

In another example, financial institutions operating in the U.S. may only exempt companies publicly listed on U.S. stock exchanges from the beneficial ownership requirement. However, U.S. financial institutions are required to perform risk-based due diligence such that, as stated in FFIEC BSA Examination Manual Customer Due Diligence Overview, "the level and type of customer information should be commensurate with the customer's risk profile, allowing banks to collect less information for customers with a lower customer risk profile." As stated in the FFIEC BSA Examination Manual Beneficial Ownership Requirements for Legal Entity Customers Overview, transparency in ownership for legal entities is widely held as lowering the likelihood of legal entities being used to facilitate money laundering and other financial crimes because their true ownership cannot be concealed. Furthermore, U.S. financial institutions may treat listed companies as less risky, and thus may apply less due diligence to companies listed on certain exchanges outside of the U.S. Thus, in performing Know Your Customer (KYC) procedures, the respective financial institutions may treat companies listed in a qualified exchange in a first manner that requires less due diligence versus companies listed in a non-qualified exchange that require additional due diligence.

Conventional approaches to determining whether exchanges are qualified exchanges may generate a score associated with financial risk. For example, a conventional approach may analyze risk associated with financial crime in a geographic region and assigning a risk score to exchanges, companies, or other entities (e.g., individual, country, etc.). In assigning the risk score, the conventional approach may calculate a risk score that indicates the financial crime risk as high, low, or medium. In another example, a conventional approach may generate a default financial crime risk rating associated with a business entity in a geographic region and customize the default financial crime risk rating of the company in compliance with rules, regulations, or laws for several other geographic regions. However, these conventional approaches rely on utilizing a score and setting a threshold on which to measure the score. Although these conventional approaches may utilize various factors and manners to reduce error, there may still arise occurrences in which false positives or false negatives arise. In a further example, a conventional approach may facilitate detection of financial crime by monitoring transactional data of business entities to detect different possible cases of financial crime and assist financial institutions to comply with different types of laws and regulations in a particular jurisdiction. However, this conventional approach is used to minimize exposure to financial crime by a company without providing the proper insight with regard to determining whether a company is listed on a qualified exchange, which may utilize a different set of standards. That is, the geographic risk rating of the company's jurisdiction may not necessarily provide a corresponding insight into the strength of the jurisdiction's oversight of its stock exchanges and listed companies.

In contrast to the conventional approaches, the exemplary embodiments may utilize various types of data to determine whether an exchange qualifies as a Qualified Exchange such that financial institutions may apply reduced due diligence to companies that are listed on the Qualified Exchange because they have lower financial crime risk. The exemplary embodiments may utilize a plurality of determinations as to whether an exchange is a Qualified Exchange. The determinations may include a set of prevailing factors that may automatically determine that the exchange is qualified when at least one prevailing factor is met. When the exchange is not determined to be a Qualified Exchange based on any of the prevailing factors, the exemplary embodiments are configured to utilize a multi-step analysis to determine any exchange that may not meet the prevailing factors but otherwise be a Qualified Exchange.

The exemplary embodiments are described with specific reference to the EU and practices as well as laws associated with the EU. However, the exemplary embodiments may be utilized and/or modified to be used in any region in which an exchange is determined to be qualified as a Qualified Exchange for reduced due diligence for listed entities on that exchange, due to meeting standards set by the respective region. The exemplary embodiments are also described for exchanges that are included in a list of available exchanges where determinations for exchanges are included in a Library. Accordingly, the exemplary embodiments may be used in determining whether any of the exchanges in the Library is a Qualified Exchange dynamically and currently at the time an analysis occurs. However, the exemplary embodiments may be utilized and/or modified to be used for any exchange utilizing any available information that may be ascertained (e.g., through publicly available sources) or requested.

The exemplary embodiments are configured to identify stock exchanges outside of a specific region that may be reasonably relied upon to obtain and publish true ownership information as it relates to legal entities traded on the stock exchange. In this manner, as noted above, the exemplary embodiments utilize a series of qualification criteria (e.g., the prevailing factors and the multi-step analysis) that are considered to be indicative of creating a stable marketplace which has sufficient power and authority to impose criteria on listed companies. As companies that are publicly owned are generally considered less susceptible than privately owned entities to engage in illegal activities or to being used by their owners to disguise the true nature/activity of the entity, the exemplary embodiments may incorporate this feature into the process of determining Qualified Exchanges. The companies being publicly owned being less susceptible to engage in illegal activities or masking hidden activity may be particularly true when the exchange on which the company is listed has rules of disclosure as well as the ability to oversee and maintain transparency in activity and ownership. Thus, financial institutions may use the exemplary embodiments to identify companies that present lower risk of financial crime via the prevailing factors to warrant less customer due diligence under local KYC requirements.

Different regions may incorporate the above feature in determining qualified exchanges. For example, in Europe and the European Economic Area (EU/EEA), an exchange may meet the criteria set forth in the exemplary embodiments to be considered a qualified exchange so that financial institutions operating in the EU/EEA may employ a simplified due diligence process for companies listed on such exchanges. In another example, in the U.S., financial institutions may assign a lower financial crime risk rating to publicly traded companies listed on Qualified Exchanges which may lead to less KYC due diligence. In this manner, the exemplary embodiments allow for compliance processes used by financial institutions to be more cost-efficient and effective by not only identifying companies needing due diligence (e.g., from being listed on a Qualified Exchange) but also by allowing financial institutions to avoid dedicating resources to creating, supporting, and maintaining their own qualifying criteria or from making case by case determinations of qualified exchanges.

FIG. 1 depicts a qualification system 100, in accordance with the exemplary embodiments. According to the exemplary embodiments, the qualification system 100 may include one or more smart devices 110, one or more data repositories 120, and an analysis server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the qualification system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the qualification system 100 that do not utilize the network 108.

In the exemplary embodiments, the smart device 110 may include a service client 112 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the service client 112 may act as a client in a client-server relationship and may be a software, hardware, and/or firmware based application capable of allowing a user to request data and receive a response to the request via the network 108. In embodiments, the service client 112 may operate as a user interface allowing the user to provide an input or selection of an exchange to request a response indicative of whether the exchange is a Qualified Exchange as well as interact with one or more components of the qualification system 100, and utilize various wired and/or wireless connection protocols for data transmission and exchange associated with data used in a qualification analysis, including Bluetooth, 2.4 gHz and 5 gHz internet, near-field communication, Z-Wave, Zigbee, etc.

The service client 112 may be utilized by a variety of entities such as an individual associated with a financial institution wishing to determine a scope for which due diligence is required for a company. As will be described in detail below, the scope of due diligence may be determined by determining a status of an exchange in which the company is listed where the status is indicative of the exchange being listed on a Qualified Exchange under a set of laws, rules, policies, etc. (e.g., a most current set). The service client 112 may provide the user interface such that an identity of the exchange may be input by the user of the service client 112. For example, the user interface may include a pull down menu including a plurality of exchanges from which to select. In another example, the user interface may include a field to allow the user of the service client 112 to enter a string indicative of an exchange for analysis. In a further example, the user interface may include both options in which to enter an identity of an exchange. The service client 112 may package a request including the identity of the exchange to be transmitted to the analysis server 130.

In the exemplary embodiments, the data repository 120 may include one or more data sources 122 and libraries 124 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the data repository 120 is shown as a single device, in other embodiments, the data repository 120 may be comprised of a cluster or plurality of electronic devices, in a modular manner, etc., working together or working independently. While the data repository 120 is also shown as a separate component, in other embodiments, the data repository 120 may be incorporated with one or more of the other components of the qualification system 100. For example, the data repository 120 may be incorporated in the analysis server 130. Thus, access to the data repository 120 by the analysis server 130 may be performed locally. While the data repository 120 is further shown as including both the data sources 122 and the libraries 124, in other embodiments, there may be respective data repositories 120 for the data sources 122 and the libraries 124. The data repository 120 is described in greater detail as a hardware implementation with reference to FIG. 4, as part of a cloud implementation with reference to FIG. 5, and/or as utilizing functional abstraction layers for processing with reference to FIG. 6.

The data sources 122 may be individual sources from which data may be retrieved regarding different exchanges. For example, the data sources 122 may be publicly available information that is maintained by third parties. Stock exchanges, registered with one or more organizations or departments, etc. may have disclosure requirements that are to be made public. The data sources 122 may incorporate such databases to ascertain this information about the exchanges. In another example, the data sources 122 may be proprietary databases that are updated and maintained to track various characteristics and information about the exchange. In yet another example, the data sources 122 may be provided with manual entries for information regarding the exchanges.

The data sources 122 may also include data associated with regions in which the exchange operates. For example, the data sources 122 may indicate whether the region is under any sanctions from a country, a governmental body (e.g., by a continent, by a country, by a world organization, etc.). In another example, the data sources 122 may indicate how other regions are associated with the region (e.g., a qualified region authorized to conduct business in the region).

The data sources 122 may be organized in a variety of manners. For example, there may be a plurality of data sources 122 where each data source 122 holds information associated with a respective exchange independent of region or other defining characteristic. In another example, there may be a plurality of data sources 122 where each data source 122 holds information for a plurality of exchanges based on a defining characteristic such as region. In a further example, there may be a single data source 122 that holds all the information for the exchanges (e.g., to reduce any redundancy).

The libraries 124 may be a database of analyzed exchanges with a corresponding indication as to whether the exchange is a Qualified Exchange or not. The libraries 124 may also indicate the reason as to why the exchange is a Qualified Exchange or not according to the criteria utilized in the exemplary embodiments. The libraries 124 may be generated for a selected region. For example, when the exemplary embodiments are utilized for the EU/EEA, the libraries 124 may be maintained according to a most current set of criteria associated with the EU/EEA. However, it should be noted that the libraries 124 may also be maintained for a variety of other regions for which the exemplary embodiments are to be utilized and the service is to be provided to users.

The libraries 124 may be maintained for a variety of reasons at a variety of times. For example, the libraries 124 may be maintained such that a request for a status of an exchange may be provided immediately. In this manner, the exemplary embodiments may conserve processing requirements for other matters. The libraries 124 may be updated and/or maintained during off peak times when requests are not being processed heavily. The libraries 124 may be updated and/or maintained based on events that trigger these operations. For example, when a criterion utilized in determining whether the exchange is a Qualified Exchange changes, the libraries 124 may be updated. According to an exemplary implementation, the libraries 124 may be reviewed and updated to ensure proper operation such that correct responses are provided for requests of a status of an exchange. In another example, the libraries 124 may be updated any time that a status of an exchange has been determined (e.g., after a request for a status of an exchange has been received).

Similar to the data sources 122, the libraries 124 may be organized in a variety of manners. For example, there may be a plurality of libraries 124 where each library 124 holds information associated with a respective exchange. Accordingly, each library 124 may be organized to indicate a status of the exchange in each region that is supported by the exemplary embodiments. In another example, there may be a plurality of libraries 124 where each library 124 holds information for a plurality of exchanges based on a defining characteristic such as region. Accordingly, each library 124 may be organized to indicate a status of the exchanges located in the region associated with the corresponding library 124. In a further example, there may be a single library 124 that holds all the information for the exchanges and the corresponding statuses for the various regions supported by the exemplary embodiments.

In the exemplary embodiments, the analysis server 130 may include a qualification program 132 and act as a server in a client-server relationship with the service client 112 as well as be in a communicative relationship with the data repository 120. The analysis server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the analysis server 130 is shown as a single device, in other embodiments, the analysis server 130 may be comprised of a cluster or plurality of computing devices, working together or working independently. While the analysis server 130 is also shown as a separate component, in other embodiments, the operations and features of the analysis server 130 may be incorporated with one or more of the other components of the qualification system 100. For example, the operations and features of the analysis server 130 may be incorporated in the smart device 110, particularly the smart device 110 of the user who is requesting the status of the exchange. The analysis server 130 is described in greater detail as a hardware implementation with reference to FIG. 4, as part of a cloud implementation with reference to FIG. 5, and/or as utilizing functional abstraction layers for processing with reference to FIG. 6.

The analysis server 130 is configured to, in response to a request for a status of an exchange, determine and transmit a response indicating whether the exchange is a Qualified Exchange. The exemplary embodiments are described with regard to receiving a request for a status of an exchange and generating a response for the request. However, the exemplary embodiments being utilized as a request and response format in which processing is performed based on receiving the request is only exemplary. The analysis server 130 may be configured to determine a status of an exchange at a variety of other times. For example, as described above, in preparation to provide the response, the analysis server 130 may update the libraries 124 prior to receiving a request. Accordingly, when a request is subsequently received, the analysis server 130 may determine the status of the exchange as indicated in the corresponding one of the libraries 124. The analysis server 130 may also perform its operations at least partially to reduce processing requirements at a time when a request is received. For example, the analysis server 130 may determine exchanges who have satisfied the prevailing factors. Thus, upon receiving a request, the analysis server 130 may dynamically determine when the multi-step analysis is to be performed.

In the exemplary embodiments, the qualification program 132 may be a software, hardware, and/or firmware application configured to receive a request for a status of an exchange, determine the status of the requested exchange, and transmit a response indicative of the status along with other pertinent information (e.g., reason for why the exchange has the determined status of being a Qualified Exchange or not). As will be described in further detail below, the qualification program 132 may perform an analysis process that utilizes a set of prevailing factors such that satisfaction of any one of the prevailing factors is indicative of the exchange being a Qualified Exchange. In the event that the exchange does not satisfy any of the prevailing factors, the analysis process performed by the qualification program 132 may include a multi-step analysis such that satisfaction of each part in the multi-step analysis is indicative of the exchange being a Qualified Exchange. Accordingly, when the exchange does not satisfy any of the prevailing factors nor satisfy the multi-step analysis, the qualification program 132 may conclude that the exchange is not a Qualified Exchange.

The qualification program 132 may be configured with criteria that has been identified as indicative of a strength and/or a capacity of the exchange coupled with considerations of a stability and rule of law of the region or jurisdiction in which the exchange is located and/or operates. The criteria may be identified through a variety of ways. For example, the criteria may be defined by laws and/or policies that are in place in a selected region. In another example, the criteria may be determined according to historical evidence with regard to determining a qualified exchange. In a particular implementation and according to the exemplary embodiments, the qualification program 132 may be developed through an analysis of a plurality of exchanges that cover exchanges whose regulatory authorities are Ordinary members of the International Organisation of Securities Commissions ("IOSCO") as well as exchanges located in regions that are members or key partners of Organization for Economic Co-operation and Development ("OECD") countries.

The qualification program 132 may be configured such that the determination of an exchange being a Qualified Exchange may be updated dynamically based on a variety of current factors. For example, the prevailing factors may be updated dynamically according to the rule of law/stability of a region. An administrator of the qualification program 132 may be provided information (e.g., from experts who determine such factors) that indicate the rule of law/stability of a region has deteriorated to an extent that certain exchanges have lost effectiveness. Thus, although the exchange may still qualify based on the standard factors, the qualification program 132 may be configured such that the qualification may be overridden with the updated prevailing factors and the exchange may not be considered a Qualified Exchange.

As will be described in further detail below, the qualification program 132 may utilize a set of prevailing factors. Satisfaction of any of the prevailing factors may automatically qualify the exchange as a Qualified Exchange. For example, the prevailing factors may be established such that an exchange located in the EU/EEA is automatically determined to be a Qualified Exchange if the exchange is on a list of Regulated Markets maintained by the European Securities and Markets Authority ("ESMA"). The prevailing factors may also be established such that an exchange located outside the EU/EEA is automatically determined to be a Qualified Exchange if the exchange is authorized to conduct business in a jurisdiction recognized by the European Commission ("EC") as an equivalent third country under the Markets in Financial Instruments Directive ("MiFID II").

If an exchange does not meet any of the criteria defined by the prevailing factors to automatically qualify as a Qualified Exchange, the qualification program 132 may determine whether the exchange is still a qualified exchange by satisfying a multi-step analysis. According to the exemplary embodiments, the qualification program 132 may utilize a multi-step analysis comprising six criteria, all of which must be satisfied for the exchange to be designated a Qualified Exchange. Failure to meet any single criterion of the multi-step analysis may result in the exchange being determined to not be a Qualified Exchange. As will be described in further detail below, the six criteria according to the exemplary embodiments may be (1) the jurisdiction in which the exchange operates not being subject to United Nations ("UN") sanctions, (2) the jurisdiction in which the exchange operates not being subject to comprehensive U.S. Office of Foreign Assets Control ("OFAC") sanctions, (3) the exchange's host country being qualified under a proprietary set of Worldwide Governance Indicators (WGI) benchmark, (4) the exchange's primary regulator being an Ordinary Member of the International Organization of Securities Commissions ("IOSCO"), (5) the exchange being licensed by the appropriate regulatory/governmental body in the region in which it operates, and (6) the threshold for the required disclosure of beneficial ownership interests of the listed entities in the exchange under exchange rules and/or applicable laws or regulations being no greater than 25%.

The prevailing factors and the multi-step analysis set forth according to the exemplary embodiments may provide reasonable assurance that exchanges listed on Qualified Exchanges are subject to robust and consistently enforced transparency, disclosure, and reporting rules. Where the exchange is determined to be a Qualified Exchange through satisfaction of any of the prevailing factors or all parts of the multi-step analysis, financial institutions' customers that are listed in the exchange may be considered to pose reduced financial risk (e.g., money laundering (ML), terrorist financing (TF), etc.) and therefore may be subjected to a more simplified due diligence review.

Figure 2:
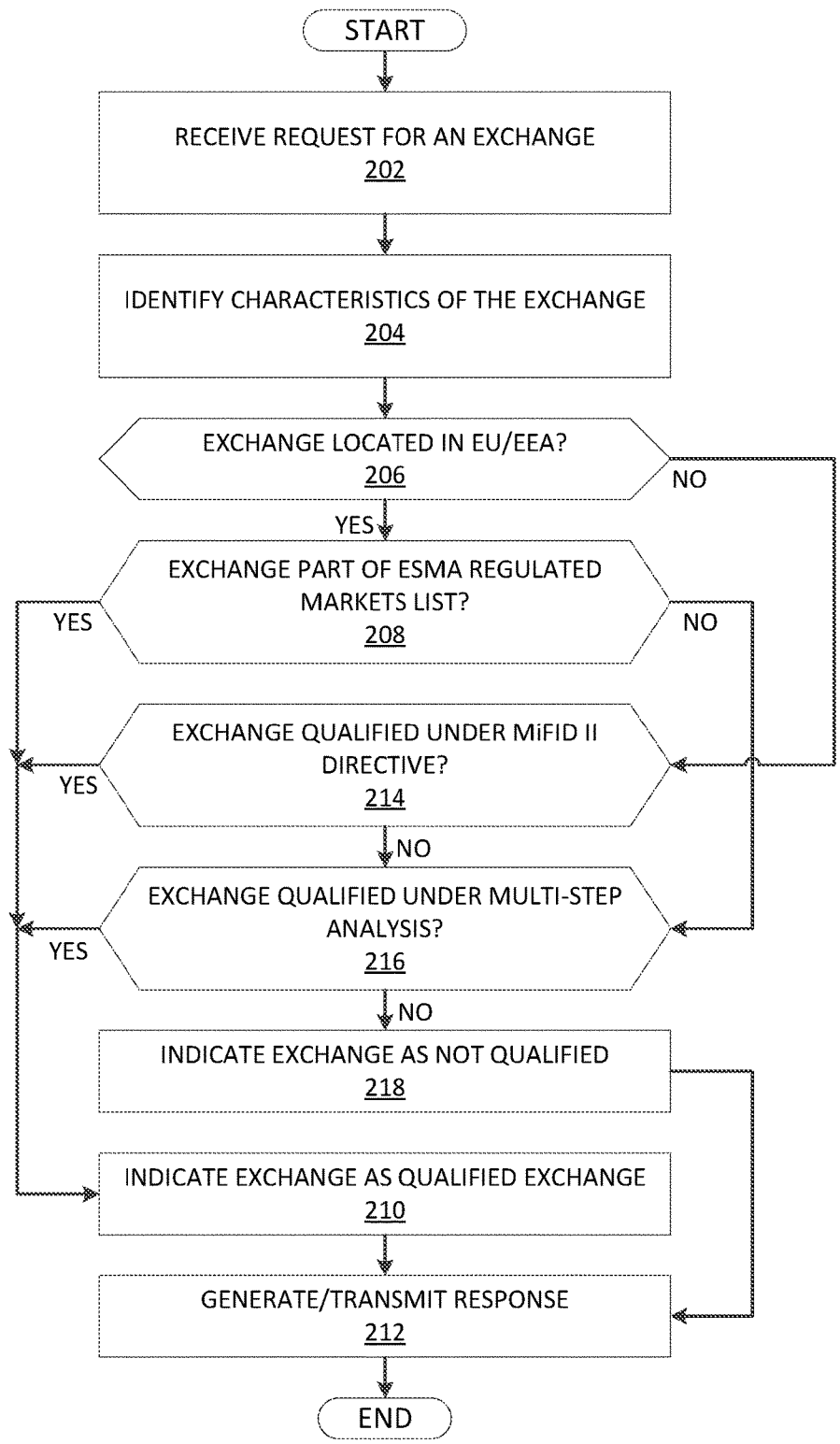
FIG. 2 depicts an exemplary flowchart of a method illustrating the operations of an analysis server 130 of the qualification system 100 in determining a Qualified Exchange, in accordance with the exemplary embodiments.

FIG. 2 depicts an exemplary flowchart of a method 200 illustrating the operations of the analysis server 130 of the qualification system 100 in determining a qualified exchange, in accordance with the exemplary embodiments. The method 200 may relate to operations that are performed by the qualification program 132 of the analysis server 130. Accordingly, the method 200 will be described from the perspective of the analysis server 130.

The analysis server 130 may receive a request for an exchange (step 202). A user may request a status for an exchange as to whether the exchange is a Qualified Exchange in a region that is selected. For example, the user may be associated with a financial institution that is required to perform due diligence on a company listed on the exchange. Based on whether the company is listed on a Qualified Exchange, the user may be required to perform a full due diligence (e.g., when the company is not listed on a Qualified Exchange) or a reduced due diligence (e.g., when the company is listed on a Qualified Exchange). Using the service client 112 on the smart device 110, the user may enter an identity of an exchange (e.g., selecting the exchange on a pull down menu, entering a string indicative of the exchange, etc.). The user may also enter an identity of a region in which the exchange is located and/or operated (e.g., selecting the region on a pull down menu, entering a string indicative of the region, etc.). Alternatively, the analysis server 130 may determine the region in which the exchange is located and/or operated.

Based on the exchange, the analysis server 130 may identify characteristics of the exchange (step 204). The analysis server 130 may access the data sources 122 that includes information of the exchange. For example, the data sources 122 may indicate a home country or a home region in which the exchange operates, any licenses that the exchange may have acquired, ownership information of the listed legal entities or companies on the exchange by individuals, etc. The data sources 122 may also include information of the home region in which the exchange operates. For example, the data sources 122 may provide a list of regions that are authorized to operate in the selected region, sanctions that may be imposed on the home region, etc.

The analysis server 130 may initially determine whether the exchange is a Qualified Exchange using the prevailing factors. The analysis server 130 may determine where an exchange is located (decision 206). The analysis server 130 may perform its operations based on the region in which the exchange operates relative to a selected region. According to the exemplary embodiments in which the selected region may be for the EU/EEA, the analysis server 130 may determine whether the exchange is located in the EU/EEA. The method 200 will further be described with reference to the EU/EEA.

As a result of determining whether the region in which the exchange is located and/or operates is the EU/EEA (decision 206, "YES" branch), the analysis server 130 may determine whether the exchange is part of a regulated markets list (decision 208). For example, with regard to the EU/EEA, the Regulated Markets list may be an ESMA regulated markets list. The ESMA is tasked with supervising capital markets in the EU to enhance investor protection and promote stable and orderly financial markets. In carrying out its mission, ESMA's core responsibilities include promoting policy convergence across EU member states, continually assessing risks to the financial system, and directly supervising certain financial market participants, such as credit rating agencies and trade repositories. Pursuant to Article 56 of the Markets in Financial Instruments Directive (MiFID), ESMA maintains and publishes a list of Regulated Markets operating within the EU and EEA (e.g., which may be indicated in one of the data sources 122). Regulated Markets include stock exchanges and other multilateral trading venues that have been duly authorized to act as such by the competent authority in their respective jurisdictions. Such authorization is granted only where the competent authority is satisfied that the Regulated Market is in compliance with the requirements of Title III of MiFID II. The analysis server 130 is configured to recognize the reduced ML and TF risk posed by legal entities or companies listed on duly authorized exchanges operating within the EU/EEA, as such markets generally are subject to robust and consistently enforced standards relating to transparency and disclosure. Therefore, an exchange included in ESMA's list of Regulated Markets is a Qualified Exchange. Thus, when the analysis server 130 determines that the exchange is part of the ESMA Regulated Markets list (decision 208, "YES" branch), the analysis server 130 may determine that the exchange is a Qualified Exchange (step 210). The analysis server 130 may then generate and transmit a response indicative of the exchange being a Qualified Exchange in the selected region (step 212).

Returning to decision 206, when the exchange is not located in the EU/EEA (decision 206, "NO" branch), the analysis server 130 may determine whether the exchange is qualified under a regional legislative directive (decision 214). For example, with regard to the EU/EEA, the regional legislative directive may be the MiFID II directive. MiFID is a broad legislative framework relating to the regulation of capital markets for purposes that include facilitating the harmonization of financial services regulation across Europe, protecting investors, increasing transparency, and managing systemic risks. An important component of MiFID is the requirement that investment firms ensure that the trading in shares of listed companies occurs on regulated markets or other MiFID-compliant platforms, or third-country trading venues assessed by the European Commission ("EC") as "equivalent" (e.g., subject to a third-country legal and supervisory framework that fulfils at least the conditions that (a) the markets are subject to authorization and to effective supervision and enforcement on an ongoing basis, (b) have clear and transparent rules regarding the admission of securities to trading so that such securities are capable of being traded in a fair, orderly and efficient manner, and are freely negotiable, (c) security issuers should be subject to periodic and ongoing information requirements ensuring a high level of investor protection, and (d) market transparency and integrity should be ensured by the prevention of market abuse in the form of insider dealing and market manipulation). Under Article 25(4) of MiFID, the EC issues equivalence determinations and maintains a list of such determinations on its public website (e.g., which may be one of the data sources 122). In light of the reduced ML/TF risk posed by publicly traded companies listed on MiFID-equivalent third-country trading venues, an exchange is a Qualified Exchange where such exchange is duly authorized to operate in a country for which the EC has issued an affirmative equivalence decision. Thus, when the analysis server 130 determines that the exchange is not in the EU/EEA but is qualified under the MiFID II directive (decision 214, "YES" branch), the analysis server 130 may determine that the exchange is a Qualified Exchange (step 210). The analysis server 130 may then generate and transmit a response indicative of the exchange being a Qualified Exchange in the selected region (step 212).

Returning to decision 208 and decision 214, the exchange may not be a Qualified Exchange under the prevailing factors. Thus, when the exchange is located in the EU/EEA but not part of the ESMA regulated markets list (decision 208, "NO" branch) or when the exchange is not located in the EU/EEA and not qualified under the MiFID II directive (decision 214, "NO" branch), the analysis server 130 may determine whether the exchange is still a Qualified Exchange based on the multi-step analysis (decision 216). The components of the multi-step analysis will be described in detail with regard to FIG. 3.

When the analysis server 130 determines that the exchange does not satisfy any of the prevailing factors but satisfies the multi-step analysis (decision 216, "YES" branch), the analysis server 130 may determine that the exchange is a Qualified Exchange (step 210). The analysis server 130 may then generate and transmit a response indicative of the exchange being a Qualified Exchange in the selected region (step 212). In generating the response, the analysis server 130 may include the reason that was met for the exchange to be determined as the Qualified Exchange (e.g., satisfied one of the prevailing factors, satisfied the multi-step analysis, etc.).

When the analysis server 130 determines that the exchange does not satisfy any of the prevailing factors and also does not satisfy the multi-step analysis (decision 216, "NO" branch), the analysis server 130 may determine that the exchange is a not Qualified Exchange (step 218). The analysis server 130 may then generate and transmit a response indicative of the exchange not being a Qualified Exchange (step 212). In generating the response, the analysis server 130 may include the reason that caused the exchange to be determined as not being a qualified exchange (e.g., did not meet any of the prevailing factors, did not meet a specific test in the multi-step analysis, etc.).

Figure 3:
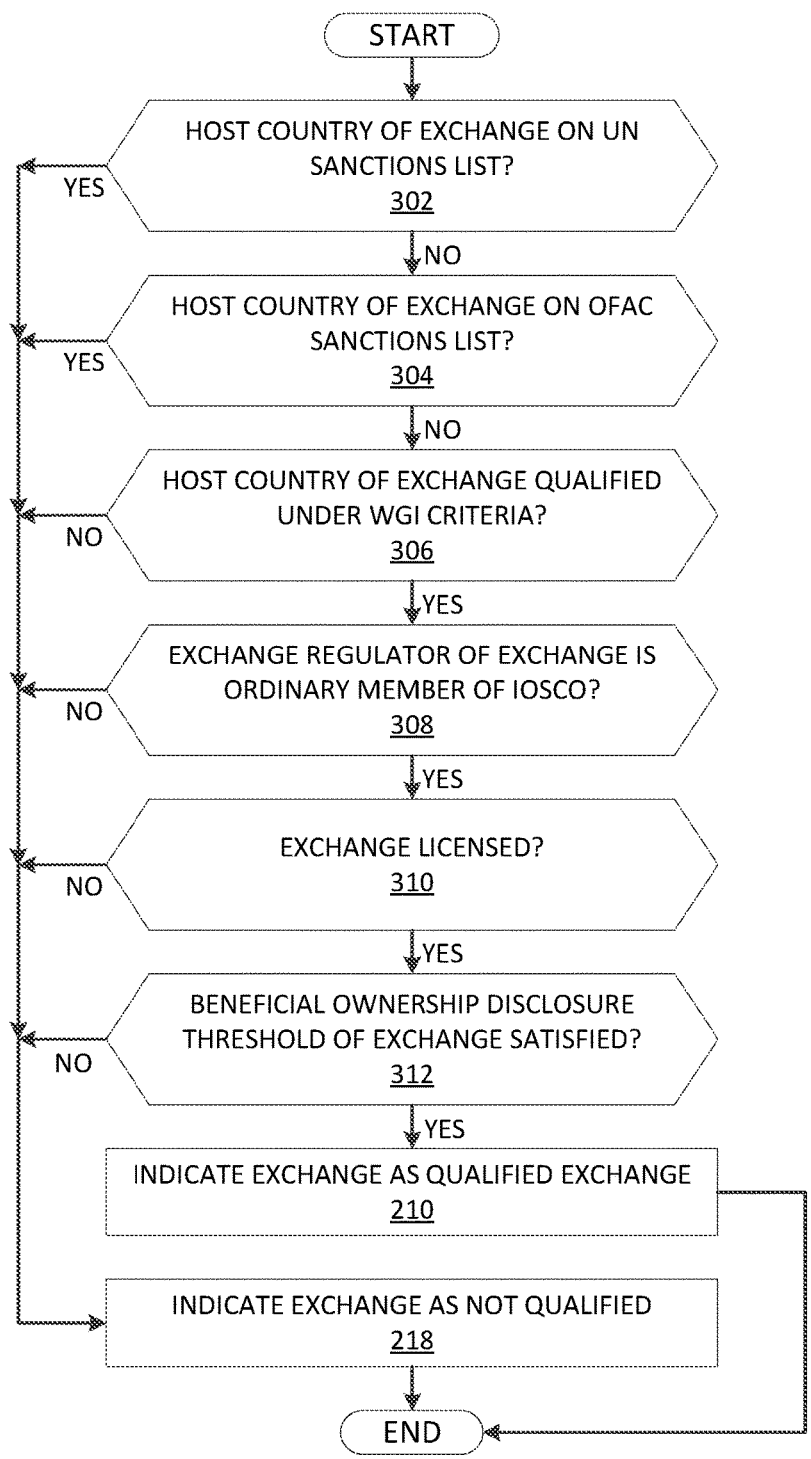
FIG. 3 depicts an exemplary flowchart of a method illustrating the operations of the analysis server 130 of the qualification system 100 in performing a multi-step analysis to determine a qualified exchange, in accordance with the exemplary embodiments.

FIG. 3 depicts an exemplary flowchart of a method 300 illustrating the operations of the analysis server 130 of the qualification system 100 in performing a multi-step analysis to determine a Qualified Exchange, in accordance with the exemplary embodiments. The method 300 may relate to operations that are performed by the qualification program 132 of the analysis server 130. Accordingly, the method 300 will be described from the perspective of the analysis server 130. The method 300 may also expand on step 216 in which the qualification program 132 performs the multi-step analysis.

After the exchange has not satisfied any of the prevailing factors, the analysis server 130 may perform a plurality of individual tests in the multi-step analysis. The method 300 is shown with the individual tests in a given order. However, the individual tests may be performed in a variety of different orders, be performed concurrently, etc. The order shown in the method 300 may be selected based on reaching a largest number of exchanges that may require the multi-step analysis. However, in other implementations, the individual tests may be performed in a different order.

The analysis server 130 may determine whether the exchange operates in a host region or country that is under global sanctions (decision 302). For example, the global sanctions may be U.N. sanctions. The U.N. is comprised of 193 member states across the globe, out of a total of 251 countries and territories recognized by the U.N., and thus is relevant to the majority of countries across the globe. The U.N. Security Council exercises its authority under the U.N. Charter to apply sanctions to support peaceful transitions, deter non-constitutional changes, constrain terrorism, protect human rights and promote non-proliferation. Sanctions have ranged from comprehensive economic and trade sanctions to more targeted measures, including arms embargoes, travel bans, and financial or commodity restrictions. Sanctions may be applied to individuals, entities, state agencies and subdivisions, as well as at the national level. Because sanctions typically are applied in connection with human rights abuses, terrorism, corruption, and political instability, they are also generally associated with increased ML and TF risk posed by the sanctioned country. As a result, where the U.N. has applied sanctions against a state, or subdivision thereof, an exchange operating in such jurisdiction may be ineligible for consideration as a Qualified Exchange. Thus, as a result of the exchange being located in a host or home region that is in the U.N. sanctions list (decision 302, "YES" branch), the analysis server 130 may determine that the exchange is not a Qualified Exchange (step 218). As a result of the exchange being a host or home region that is not in the U.N. sanctions list (decision 302, "NO" branch), the analysis server 130 may continue the multi-step analysis.

In continuing the multi-step analysis, the analysis server 130 may determine whether the host or home region of the exchange operates subject to comprehensive sanctions of a different region (decision 304). For example, the sanctions of the different region may be subject to OFAC sanctions. The majority of global trade activity is conducted in U.S. dollars. Thus, U.S. sanctions are a relevant benchmark to consider in determining whether an exchange is a Qualified Exchange. If a company were listed on an exchange located in a country broadly sanctioned by the U.S., the analysis server 130 may be configured to incorporate that most financial institutions would want to subject that company to enhanced, rather than simplified, due diligence to manage potential sanctions exposure on U.S. dollar transactions. The U.S. Treasury Department's OFAC is responsible for applying and enforcing economic and trade sanctions on behalf of the United States. Sanctions may be either comprehensive (e.g., prohibiting all transactions between the sanctioned country and the U.S. unless a special license is granted by OFAC), or non-comprehensive (e.g., limiting activity of a specific customer, company, industry, practice, or individual). Where a country is subject to comprehensive OFAC sanctions, any exchanges operating in such a jurisdiction or region is considered ineligible for being determined as a Qualified Exchange. Thus, as a result of the company operating under OFAC sanctions (decision 304, "YES" branch), the analysis server 130 may determine that the exchange is not a Qualified Exchange (step 218). As a result of the exchange not operating in a home or host region under OFAC sanctions (decision 304, "NO" branch), the analysis server 130 may continue the multi-step analysis.

In continuing the multi-step analysis, the analysis server 130 may determine whether the home or host region in which the exchange operates qualifies under a global benchmark (decision 306). For example, the global benchmark may be a WGI benchmark. The WGI represents a long-standing research program of the World Bank. The WGI publishes six broad dimensions of governance for over 200 countries and territories over the period 1996-2018. These aggregate indicators combine the views of a large number of enterprise, citizen and expert survey respondents in industrial and developing countries. They are based on over 30 individual data sources (e.g., which may be included in the data sources 122) produced by a variety of survey institutes, think tanks, non-governmental organizations, international organizations, and private sector firms. The World Bank publishes scores for each country across the following six dimensions of governance: voice and accountability, political stability and absence of violence, government effectiveness, regulatory quality, rule of law, and control of corruption. Each dimension, for a certain jurisdiction or region, is given a score that ranges between −2.5 to 2.5, with higher scores corresponding with better governance. The analysis server 130 may be configured to utilize the WGI dimensions to determine the extent to which the characteristics of a country or region where the exchange is located may encourage and support a stable marketplace which has sufficient power and authority to impose criteria on companies listed on the exchange. The analysis server 130 may selectively utilize these WGI dimensions. For example, the analysis server 130 may utilize government effectiveness, regulatory quality, rule of law, and control of corruption as these dimensions may be relevant in determining a Qualified Exchange, whereas the voice and accountability and political stability and absence of violence dimensions may include overlapping criteria with government effectiveness and control of corruption, thereby being redundant. According to the WGI criteria, for an exchange to be determined to be a Qualified Exchange, the home or host country or region where the exchange operates must receive a positive score for all four dimensions considered by the analysis server 130. Thus, as a result of the exchange being located in a host or home region that is not qualified under the WGI criteria (e.g., a negative score) (decision 306, "NO" branch), the analysis server 130 may determine that the exchange is not a Qualified Exchange (step 218). As a result of the exchange being located in a host or home region that is qualified under the WGI criteria (e.g., a positive score) (decision 306, "YES" branch), the analysis server 130 may continue the multi-step analysis.

In continuing the multi-step analysis, the analysis server 130 may determine whether the exchange's primary regulator is a selected type of member of an international organization (decision 308). For example, the selected type of member may be an Ordinary Member and the international organization may be IOSCO. IOSCO is an international association of governmental and regulatory bodies responsible for overseeing securities markets around the world. IOSCO aims to establish and maintain worldwide standards to ensure efficient, orderly, transparent, and fair markets and to address systemic risks. IOSCO has 227 members, which fall into three categories: i) Ordinary Members, which generally include the primary national securities regulators in their respective jurisdictions; ii) Associate Members, which are primarily agencies or branches of government other than the principal national securities regulator that have some regulatory authority over securities markets; and iii) Affiliate Members, which include self-regulatory organizations, stock exchanges, financial market utilities, and other bodies with an appropriate interest in securities regulation. IOSCO has 129 Ordinary Members which are also members of IOSCO's Presidents Committee and have voting power at IOSCO's annual conference. Ordinary IOSCO membership is important for demonstrating that the exchange's primary regulator is engaged in processes designed to promote cross-border information sharing and policy coordination. Such commitment helps to mitigate the ML and TF risk posed by entities and markets subject to these supervisors' oversight. The analysis server 130 therefore requires that an exchange be supervised by an Ordinary Member of IOSCO for consideration as a Qualified Exchange. Thus, as a result of the exchange not being supervised by an Ordinary Member of IOSCO (decision 308, "NO" branch), the analysis server 130 may determine that the exchange is not a Qualified Exchange (step 218). As a result of the exchange being supervised by an Ordinary Member of IOSCO (decision 308, "YES" branch), the analysis server 130 may continue the multi-step analysis.

In continuing the multi-step analysis, the analysis server 130 may determine whether the exchange is duly registered/ licensed with the appropriate regulator or other governmental institution in the jurisdiction or region in which it operates. The analysis server 130 may be configured such that an exchange must operate in a jurisdiction or region requiring registration with, or licensing by, a regulator or other government body as a prerequisite to acting as a securities exchange. Such registration/licensing typically requires exchanges to maintain systems and rules designed to promote transparent and efficient markets, protect investors, and detect and prevent fraud and manipulative trading practices. Accordingly, an exchange will only be considered a Qualified Exchange if appropriately registered or licensed with a competent government authority in the jurisdiction or region in which it operates. Thus, as a result of the exchange not being duly registered or licensed (decision 310, "NO" branch), the analysis server 130 may determine that the exchange is not a Qualified Exchange (step 218). As a result of the exchange being duly registered or licensed (decision 310, "YES" branch), the analysis server 130 may continue the multi-step analysis.

In continuing the multi-step analysis, the analysis server 130 may determine whether a threshold for the required disclosure of beneficial ownership interests in listed companies under exchange rules and/or applicable laws or regulations is met (decision 312). For example, the threshold may be set to being no greater than 25%. Many jurisdictions or regions require listed companies on the exchange to publicly disclose the identities of any individuals or entities acquiring a beneficial ownership stake or control interest above a certain threshold. This requirement may be imposed by law or regulation and/or by the rules of the exchange on which the company is listed. Information pertaining to beneficial ownership and control of any legal entity is critical in assessing ML and TF risk. Therefore, an exchange shall not be considered a Qualified Exchange unless the rules of the exchange and/or the laws or regulations of the jurisdiction or region in which the exchange operates require that listed companies and/or shareholders publicly disclose such information. Further, while the threshold may vary by jurisdiction or region, the analysis server 130 may require that the reporting trigger be no greater than an aggregate 25% ownership or control interest by any individual or entity. Thus, as a result of the exchange not meeting the ownership threshold (decision 312, "NO" branch), the analysis server 130 may determine that the exchange is not a Qualified Exchange (step 218). As a result of the exchange meeting the ownership threshold (decision 312, "YES" branch), each test of the multi-step analysis may be satisfied such that the exchange may be determined to be a Qualified Exchange (step 210).

When the analysis server 130 is utilized to update the libraries 124 with statuses of exchanges, the analysis server 130 may include an overriding mechanism. For example, even when an exchange is determined to be a Qualified Exchange in a selected region according to the methods 200, 300 of FIGS. 2, 3, respectively, the exemplary embodiments may still subject the exchange to a subjective evaluation before being published in the libraries 124. The overriding mechanism may include an application of expert judgments and subscriber feedback from users of the exemplary embodiments. Factors that may result in an override may include a recent destabilization of a country's or region's rule of law in a manner that may have a follow-on effect in the effectiveness of its exchange rules and oversight. To further aid in the overriding mechanism, the analysis server 130 may be configured to receive feedback from subscribers or users upon sharing the covered exchanges and their ratings as to be included in the libraries 124. The overriding mechanism may allow for subscribers or users to provide substantive feedback in a way that may affect the ratings and ultimate determination of whether the overriding mechanism is to be used in changing a status of an exchange. The exemplary embodiments may be configured to override the determination of the analysis server 130. In such a scenario, the analysis server 130 may append documentation as to the reason for this change in status.

The exemplary embodiments are configured to determine a qualification status of an exchange located and/or operating in a region. The exemplary embodiments may perform a qualification analysis in determining the qualification status by first utilizing a set of prevailing factors that automatically qualify the exchange as a Qualified Exchange and subsequently utilizing a multi-step analysis as a result of the exchange not satisfying any of the prevailing factors. The multi-step analysis may include a plurality of tests must each be satisfied by the exchange to determine the exchange as a Qualified Exchange. Thus, in receiving a request for a status of an exchange in a selected region, the exemplary embodiments may generate and transmit a response that indicates the status of the exchange as well as reasoning as to how the status was determined.

Figure 4:
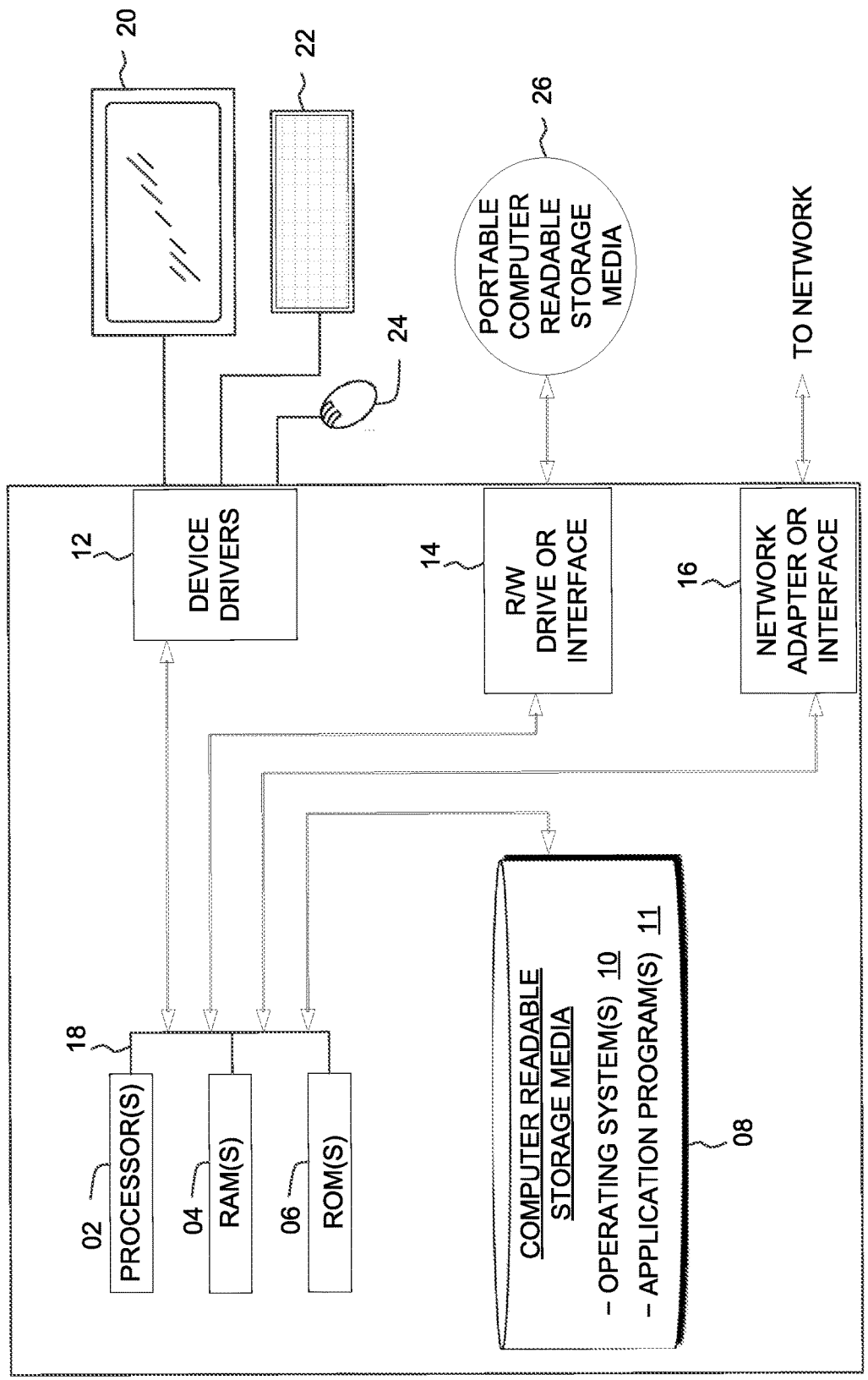
FIG. 4 depicts an exemplary block diagram depicting the hardware components of the qualification system 100 of FIG. 1, in accordance with the exemplary embodiments.

FIG. 4 depicts a block diagram of devices within the qualification system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
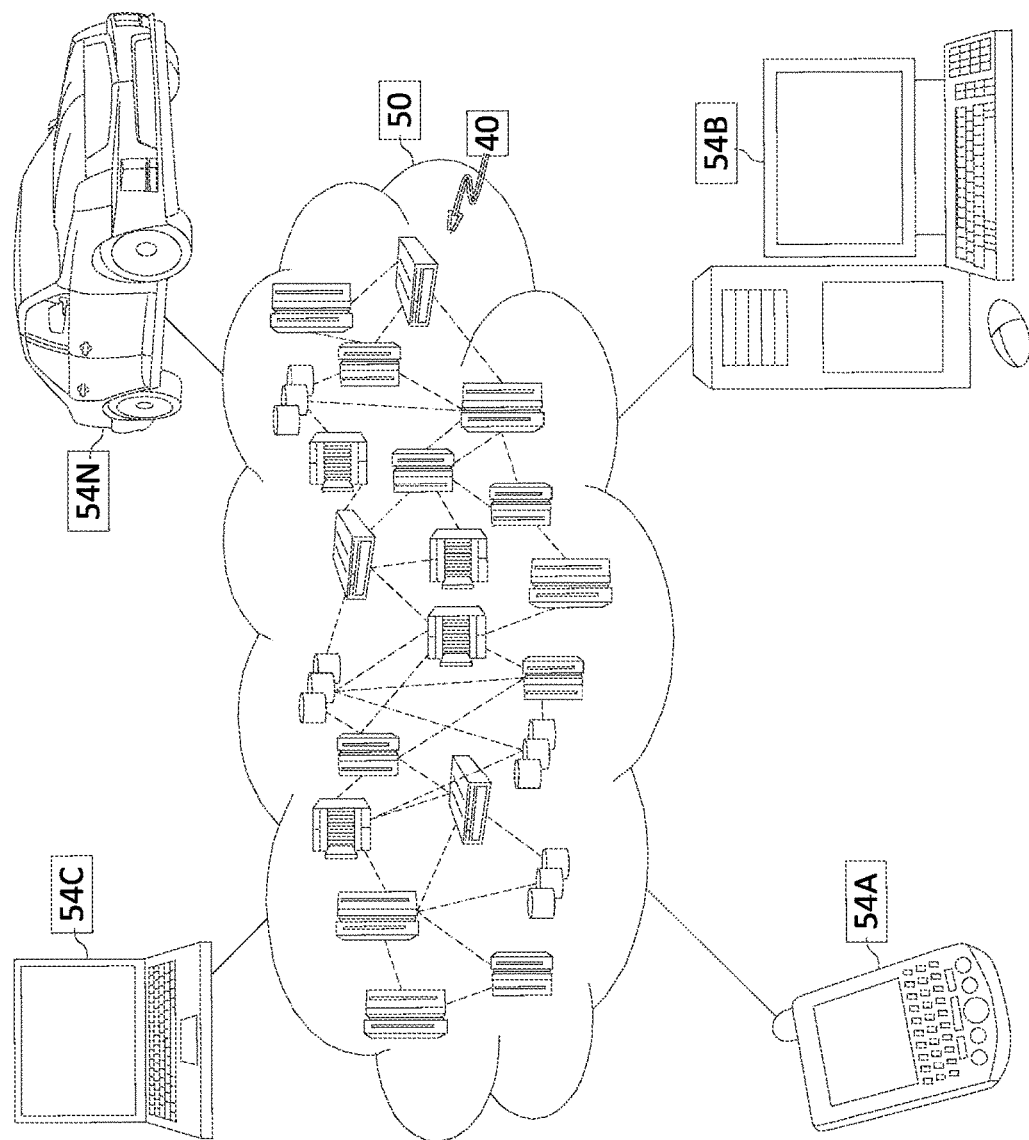
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
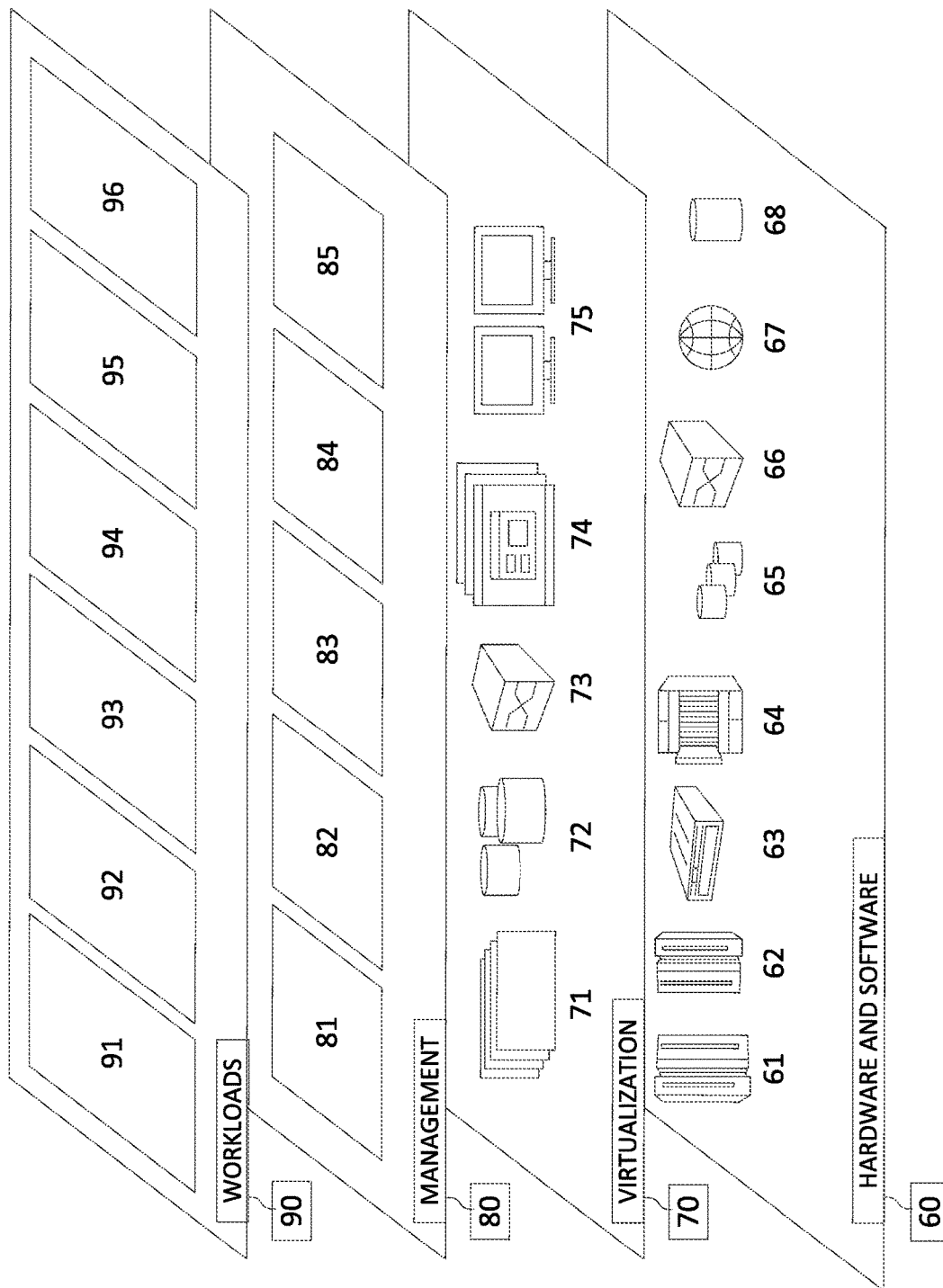
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and qualification processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for determining a qualified exchange, the method comprising:
   receiving a request for a qualification of an exchange, wherein the qualification of the exchange is based on a plurality of regulatory criterion specific to a geographic region, wherein the regulatory criterion are each linked to an external regulatory source;
   updating the regulatory criterion automatically when a change is made to at least one external regulatory source, wherein the updated regulatory criterion is determined by a qualification program included in an analysis server;
   determining the qualification of the exchange automatically based on the updated regulatory criterion using a qualification analysis performed by the qualification program when the change is made to the at least one external regulatory source, the qualification analysis including a plurality of prevailing factors and a multi-step analysis, satisfaction of one of the prevailing factors automatically qualifying the exchange as the qualified exchange, the multi-step analysis including a plurality of tests, satisfaction of each of the tests qualifying the exchange as the qualified exchange; and
   generating a response indicative of the qualification of the exchange.

2. The computer-implemented method of claim 1, wherein the multi-step analysis is used as a result of the exchange not satisfying any of the prevailing factors.

3. The computer-implemented method of claim 1, wherein the prevailing factors comprises:
   determining a region where the exchange is located;
   as a result of the determined region being a selected region, determining whether the exchange is part of a regulated markets list of the determined region; and
   as a result of the exchange being located outside the selected region, determining whether the exchange is the qualified exchange based on a regional legislative directive.

4. The computer-implemented method of claim 1, wherein the tests of the multi-step analysis comprises:
   determining whether the exchange operates in a host region under global sanctions;
   determining whether the exchange operates in a host region subject to comprehensive sanctions of a further region;
   determining whether the exchange satisfies a global benchmark;
   determining whether a primary regulator of the exchange is a member of an international organization;
   determining whether the exchange is duly registered or licensed in an operating region; and
   determining whether a disclosure of beneficial ownership interests of companies listed on the exchange satisfies a threshold.

5. The computer-implemented method of claim 1, wherein the response includes a reason for determining the qualification of the exchange.

6. The computer-implemented method of claim 1, further comprising:
   storing the qualification of the exchange in a library.

7. The computer-implemented method of claim 3, wherein the selected region is the European Union or the European Economic Area.

8. A computer program product for determining a qualified exchange, the computer program product comprising:
   one or more non-transitory computer-readable storage media and program instructions stored on the one or more non-transitory computer-readable storage media capable of performing a method, the method comprising:
   receiving a request for a qualification of an exchange, wherein the qualification of the exchange is based on a plurality of regulatory criterion specific to a geographic region, wherein the regulatory criterion are each linked to an external regulatory source;
   updating the regulatory criterion automatically when a change is made to at least one external regulatory source, wherein the updated regulatory criterion is determined by a qualification program included in an analysis server;
   determining the qualification of the exchange automatically based on the updated regulatory criterion using a qualification analysis performed by the qualification program when the change is made to the at least one external regulatory source, the qualification analysis including a plurality of prevailing factors and a multi-step analysis, satisfaction of one of the prevailing factors automatically qualifying the exchange as the qualified exchange, the multi-step analysis including a plurality of tests, satisfaction of each of the tests qualifying the exchange as the qualified exchange; and
   generating a response indicative of the qualification of the exchange.

9. The computer program product of claim 8, wherein the multi-step analysis is used as a result of the exchange not satisfying any of the prevailing factors.

10. The computer program product of claim 8, wherein the prevailing factors comprises:
 determining a region where the exchange is located;
 as a result of the determined region being a selected region, determining whether the exchange is part of a regulated markets list of the determined region; and
 as a result of the exchange being located outside the selected region, determining whether the exchange is the qualified exchange based on a regional legislative directive.

11. The computer program product of claim 8, wherein the tests of the multi-step analysis comprises:
 determining whether the exchange operates in a host region under global sanctions;
 determining whether the exchange operates in a host region subject to comprehensive sanctions of a further region;
 determining whether the exchange satisfies a global benchmark;
 determining whether a primary regulator of the exchange is a member of an international organization;
 determining whether the exchange is duly registered or licensed in an operating region; and
 determining whether a disclosure of beneficial ownership interests of companies listed on the exchange satisfies a threshold.

12. The computer program product of claim 8, wherein the response includes a reason for determining the qualification of the exchange.

13. The computer program product of claim 8, wherein the method further comprises:
 storing the qualification of the exchange in a library.

14. The computer program product of claim 10, wherein the selected region is the European Union or the European Economic Area.

15. A computer system for fusing data for determining a qualified exchange, the computer system comprising:
 one or more computer processors, one or more computer-readable storage media, and program instructions stored on the one or more of the computer-readable storage media for execution by at least one of the one or more processors capable of performing a method, the method comprising:
 receiving a request for a qualification of an exchange, wherein the qualification of the exchange is based on a plurality of regulatory criterion specific to a geographic region, wherein the regulatory criterion are each linked to an external regulatory source;
 updating the regulatory criterion automatically when a change is made to at least one external regulatory source, wherein the updated regulatory criterion is determined by a qualification program included in an analysis server;
 determining the qualification of the exchange automatically based on the updated regulatory criterion using a qualification analysis performed by the qualification program when the change is made to the at least one external regulatory source, the qualification analysis including a plurality of prevailing factors and a multi-step analysis, satisfaction of one of the prevailing factors automatically qualifying the exchange as the qualified exchange, the multi-step analysis including a plurality of tests, satisfaction of each of the tests qualifying the exchange as the qualified exchange; and
 generating a response indicative of the qualification of the exchange.

16. The computer system of claim 15, wherein the multi-step analysis is used as a result of the exchange not satisfying any of the prevailing factors.

17. The computer system of claim 15, wherein the prevailing factors comprises:
 determining a region where the exchange is located;
 as a result of the determined region being a selected region, determining whether the exchange is part of a regulated markets list of the determined region; and
 as a result of the exchange being located outside the selected region, determining whether the exchange is the qualified exchange based on a regional legislative directive.

18. The computer system of claim 15, wherein the tests of the multi-step analysis comprises:
 determining whether the exchange operates in a host region under global sanctions;
 determining whether the exchange operates in a host region subject to comprehensive sanctions of a further region;
 determining whether the exchange satisfies a global benchmark;
 determining whether a primary regulator of the exchange is a member of an international organization;
 determining whether the exchange is duly registered or licensed in an operating region; and
 determining whether a disclosure of beneficial ownership interests of companies listed on the exchange satisfies a threshold.

19. The computer system of claim 15, wherein the response includes a reason for determining the qualification of the exchange.

20. The computer system of claim 15, wherein the method further comprises:
 storing the qualification of the exchange in a library.

* * * * *